2,836,622

PREPARATION OF CARBONYL FLUORIDE

Charles W. Tullock, Wilmington, Del., assignor to E. I. du Pont de Nemours and Company, Wilmington, Del., a corporation of Delaware No Drawing. Application February 18, 1955
Serial No. 489,294

10 Claims. (Cl. 260—544)

This invention relates to a new process for preparing fluorine-containing organic compounds. In particular, it relates to a new process for preparing carbonyl fluoride.

It has recently been discovered that valuable fluorocarbons, including tetrafluoroethylene, can be synthesized in very good yields by reacting carbonyl fluoride with carbon at high temperatures, for example, by bringing carbonyl fluoride in contact with the carbon electrodes of an electric arc. This discovery is disclosed and claimed in application Ser. No. 420,472, filed on April 1, 1954, by M. W. Farlow and E. L. Muetterties and issued May 24, 1955, as U. S. Patent 2,709,189.

Adequate commercial exploitation of this discovery would of course be furthered by economical syntheses of carbonyl fluoride in an acceptable state of purity, and in particular, free from hydrogen chloride. Such a synthesis has heretofore been lacking. Carbonyl fluoride has been prepared by reaction of silver II fluoride with carbon monoxide [Ruff et al., Z. anorg. allgem. Chem. 221, 154 (1934)] and, as a mixture with many other products, by direct fluorination of acetone [Fukuhara et al., J. Am. Chem. Soc. 63, 788 (1941)]. A much more practical method involving the reaction of hydrogen fluoride with phosgene has been reported, first by Simons et al., who obtained chiefly carbonyl fluorochloride [J. Am. Chem. Soc. 68, 1672 (1946)], then by Kwasnik [FIAT Review of German Science 1939–1946, Inorganic Chemistry I, p. 242 (1948)]. However, even this latter method has little practical utility since the reports indicate that these workers were unable to separate the carbonyl fluoride from the hydrogen chloride formed in the reaction. The reason for this is that the two compounds have practically the same boiling points, −83.1 and −83.7° C., respectively. Moreover, the usual absorbents for hydrogen chloride react with, and destroy, carbonyl fluoride.

This invention has as an object a process for the preparation of carbonyl fluoride, $COF_2$. A further object is a process providing carbonyl fluoride essentially free from deleterious contaminants. Another object is the provision of a process for preparing fluorochlorocarbons. A still further object is a process for preparing fluorochloromethanes. Still another object is a process for preparing carbonyl fluoride from carbonyl chlorofluoride. Other objects will appear hereinafter.

The present invention is to a process wherein phosgene is reacted with at least a molar equivalent of hydrogen fluoride, HF, at a temperature of at least 50° C. and the reaction product with or without a preliminary separation therefrom of unreacted phosgene and/or hydrogen fluoride is brought into contact with a stoichiometric amount, based on the hydrogen chloride in the reaction product and on any hydrogen fluoride there present, of an inorganic material inert to carbonyl fluoride but reactive with hydrogen chloride to form stable products, said inorganic material being maintained in contact with the reaction product at a temperature at least as high as 0° C. until substantially all of the hydrogen chloride is removed therefrom.

With respect to the reactants used in this process, the phosgene can be preformed or it can be formed in situ from carbon monoxide and chlorine which, as is well known, combine readily at elevated temperature to give phosgene. When this is done, the carbon monoxide is preferably, though not necessarily, used in excess over the amount calculated to react with the chlorine. Similarly, the hydrogen fluoride can be used preformed, as the substantially anhydrous material, or if desired, it can be prepared in situ by employing approximately equivalent amounts of a strong, substantially anhydrous acid such as sulfuric acid or hydrogen chloride and of an alkaline or alkaline earth metal fluoride, such as sodium or calcium fluoride. This embodiment is not preferred, however, because of the additional difficulties encountered in mixing the reactants and in separating the reaction product from solid by-products. Another method of forming both phosgene and hydrogen fluoride in situ involves reacting together formaldehyde, chlorine and a metal fluoride, e. g., calcium fluoride. The reactions taking place are presumably $H_2CO + 2Cl_2 \rightarrow COCl_2 + 2HCl$ and

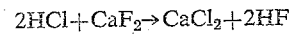

$$2HCl + CaF_2 \rightarrow CaCl_2 + 2HF$$

Regardless of whether the phosgene and hydrogen fluoride are used preformed or are formed in situ, it is desirable that there be in the reaction mixture at lease one mole of hydrogen fluoride per mole of phosgene, in order to obtain satisfactory yields of carbonyl fluoride. Since the formation of carbonyl fluoride requires two moles of hydrogen fluoride per mole of phosgene, it is generally preferred to use the reactants in approximately those proportions, or to use a small to moderate excess of hydrogen fluoride, e. g., to use up to three moles hydrogen fluoride per mole of phosgene.

The rate of the reaction between phosgene and hydrogen fluoride is almost negligible below 50° C., and the reaction should therefore be carried out above that temperature. While the reaction rate is already much increased at temperatures in the neighborhood of 100° C., it is much preferred from a practical standpoint to use temperatures of at least 150° C. The temperature can be as high as the decomposition point of the reactants but it is not desirable to exceed 700° C. and preferably about 500° C. when carbonyl fluoride is the desired main product because the yields of carbonyl fluoride decrease when this temperature is approached and other products form in increasing amounts, as discussed below. The preferred temperature range is that between 150° and 400° C., and still more preferably 150–300° C.

The reaction is most conveniently carried out at atmospheric pressure, for example, in a tubular reactor which may be packed with contact materials such as active carbon or calcium fluoride powder or pellets, although this is not essential since satisfactory, although lower, conversions to carbonyl fluoride are obtained in the absence of such materials. However, the use of active carbon, which acts as a reaction catalyst, is preferred since it leads to high conversions at relatively low temperatures. In atmospheric pressure operation, a gaseous mixture in the proper proportions of hydrogen fluoride and phosgene, or of hydrogen fluoride, carbon monoxide and chlorine is passed through the reactor heated to the desired temperature. The contact time is not very critical since appreciable conversions are observed even at very short contact times, e. g., 5 seconds. Good results are obtained at contact times in the range of 15–60 seconds, although much longer contact times can be used, e. g., 5 minutes or more. The effluent gas is treated as described below to remove the hydrogen chloride formed, and also any unreacted hydrogen fluoride.

Another satisfactory mode of operating consists in carrying out the reaction in sealed, corrosion-resistant pressure vessels, and preferably at the autogenous pressure developed by the reactants at the operating temperature. If desired, additional pressure provided by a non-interfering gas such as nitrogen or carbon monoxide can be applied. In particular, carbon monoxide can be introduced into the reaction vessel to any desired degree of initial pressure, for example between 10 and 800 atmospheres, especially when the phosgene is synthesized in situ from its components, chlorine and carbon monoxide. However, no substantial advantage appears to result from using carbon monoxide much in excess over the amount required to form phosgene. Within the preferred temperature range of 150–400° C., the reaction time in pressure vessels can be quite short. Substantial yields are obtained with a reaction time as short as 10–30 minutes, especially when a catalyst such as active carbon is used. It is not necessary to use reaction times exceeding three hours, and in fact it is undesirable to do so in the higher temperature ranges, e. g., 400–500° C., since the yield of carbonyl fluoride appears to decrease as a consequence.

Active carbon, that is, very finely divided, porous carbon having a total surface area of at least 20 square meters per gram [Hassler, "Active Carbon," Chemical Publishing Co. (1951), p. 127], is a desirable catalyst for the reaction of phosgene with hydrogen fluoride. Higher conversions to carbonyl fluoride can be obtained when this catalyst is used than without it, particularly in the lower temperature range, e. g., 150–250° C. Good results are obtained by using between 1% and 20% of active carbon, based on the weight of the phosgene present in static systems under pressure. When operating continuously, at atmospheric pressure, the gaseous reactant mixture is simply passed through a bed of active carbon maintained at reaction temperature. The catalyst can be reused a number of times without purification.

The principal carbon-fluorine compound obtained by the reaction of hydrogen fluoride with phosgene is carbonyl fluoride, $COF_2$. The crude reaction product normally contains variable amounts of unreacted starting materials, and the hydrogen chloride formed in the reaction. In addition, some carbonyl chlorofluoride, COFCl, is formed, generally in relatively small amounts unless the initial mole ratio of hydrogen fluoride to phosgene is substantially less than 2:1. Carbon dioxide is present in the reaction product, generally in small amounts. In the higher range of reaction temperature, e. g., above about 400° C., other carbon-fluorine compounds are formed in increasing amounts. These are the chlorofluoromethanes, and particularly chlorotrifluoromethane and dichlorodifluoromethane. Carbon tetrafluoride and trichlorofluoromethane also appear in minor amounts. These compounds while minor in amount can be recovered as by-products. The copending application of Donald D. Coffman and Charles W. Tullock, Serial No. 489,296, filed of even date herewith, now U. S. Patent 2,757,213, issued July 31, 1956, discloses a process for the preparation of carbon tetrafluoride and chlorofluoromethanes by reacting hydrogen fluoride with phosgene and carbon at temperatures of 600° C. and above.

Carbonyl chlorofluoride, which is formed in appreciable amounts in the reaction, can readily be converted in substantial yields to carbonyl fluoride, thus increasing the yield of the latter. This is done simply by heating carbonyl chlorofluoride at a temperature in the range of 400–600° C., preferably in a sealed vessel under the autogenous pressure developed, under which conditions disproportionation of the carbonyl chlorofluoride occurs. For example, when a sample of substantially pure carbonyl chlorofluoride is heated in a corrosion resistant bomb at 500° C. for two hours, the resulting gaseous product is found by infrared analysis to contain, on a molar basis, 50% carbonyl fluoride, 35% carbonyl chlorofluoride, 10% phosgene, 3% carbon dioxide and 2% dichlorodifluoromethane. The carbonyl fluoride is readily separated from the mixture by fractional distillation as shown below. Under the same conditions, but in the presence of a small amount, 1–5%, by weight, of calcium fluoride, a similar disproportionation takes place except that a higher amount of chlorofluoromethanes ($CCl_2F_2$ and $CF_3Cl$) is found in the product. Thus, it is apparent that the carbonyl chlorofluoride can be largely converted into valuable products.

If it were not for the presence of hydrogen chloride, the separation of carbonyl fluoride from the other components of the crude reaction product would offer no special difficulty. Fractionation in a low temperature still accomplishes this separation. Even carbon dioxide, which sublimes at $-78°$ C., can be to a large extent separated from carbonyl fluoride (P. B. $-83.1°$ C.) owing to the fact that it appears to form a constant boiling mixture with carbonyl fluoride and concentrates in the first fraction of this compound distilling over. In any event, carbon dioxide is formed only in small amounts and does not normally interfere with the reactions of carbonyl fluoride, especially its reaction with carbon at high temperatures, e. g., 1500° C. or higher as in the carbon arc, to give tetrafluoroethylene.

Hydrogen chloride, however, which boils at $-83.7°$ C., cannot be separated from carbonyl fluoride by distillation and it is undesirable as an impurity. The synthesis of carbonyl fluoride from phosgene and hydrogen fluoride is impractical unless the by-product hydrogen chloride can be removed. Aqueous acid absorbent systems cannot be employed nor can numerous materials capable of absorbing hydrogen chloride, e. g., calcium oxide, soda lime, aluminum oxide, potassium acetate, boric anhydride, acetic anhydride, and pyridine. Anhydrous alkaline agents such as disodium hydrogen phosphate were found not to remove hydrogen chloride.

Agents which have been found capable of absorbing hydrogen chloride without reacting with carbonyl fluoride or carbonyl chlorofluoride are the alkali metal fluorides, used in anhydrous form, sulfur trioxide, and phosphorus pentoxide. These agents also remove hydrogen fluoride from the reaction product, which is another advantage, although a less important one since hydrogen fluoride can be separated from carbonyl fluoride by distillation.

With the anhydrous alkali metal fluorides, e. g., sodium fluoride, hydrogen chloride reacts with formation of sodium chloride and sodium acid fluoride, according to the equation $HCl+2NaF \rightarrow NaCl+NaF.HF$. From this it will be seen that it is necessary to use two moles of sodium fluoride per mole of hydrogen chloride. The use of lesser amounts of sodium fluoride results in incomplete removal of the hydrogen chloride. In practical operation it is desirable to trap out most or all of the excess hydrogen fluoride, if any, from the reaction gases. The gases are then analyzed, preferably by infrared technique, for hydrogen fluoride and hydrogen chloride content and treated with at least the amount of sodium fluoride stoichiometrically equivalent to the hydrogen fluoride and hydrogen chloride according to the equations:

$$HCl+2NaF \rightarrow NaCl+NaHF_2$$

and $$HF+NaF \rightarrow NaHF_2$$

When the hydrogen fluoride and the phosgene are used in substantially equivalent amounts (2 moles hydrogen fluoride per mole of phosgene) it is only necessary to use sodium fluoride in amount equivalent to the hydrogen chloride theoretically formed (2 moles sodium fluoride per mole hydrogen chloride, that is, 4 moles sodium fluoride per mole of phosgene) since this will be sufficient to absorb all the hydrogen chloride formed and any unreacted hydrogen fluoride.

Potassium fluoride reacts similarly, except that in this case somewhat smaller amounts may be permissible since potassium acid fluorides containing higher than molar amounts of hydrogen fluoride can form, such as KF.2HF and KF.3HF. Even so, however, it is recommended to use two moles of potassium fluoride per mole of hydrogen chloride formed, and one mole per mole of excess hydrogen fluoride to insure complete absorption.

Sulfur trioxide (sulfuric anhydride, $SO_3$) removes hydrogen chloride completely with formation of chlorosulfonic acid, $ClSO_3H$. Only one mole of sulfur trioxide per mole of hydrogen chloride and one mole per mole of excess hydrogen fluoride are used to insure complete absorption. There is no detectable reaction between carbonyl fluoride and sulfur trioxide at room temperature, even after several days' contact. However, when the phosgene/hydrogen fluoride reaction product is treated with sulfur trioxide, it is found to contain somewhat more carbon dioxide than upon treatment with sodium fluoride. However, additional formation of carbon dioxide can be minimized by using only a short contact time between sulfur trioxide and the reaction product, since sulfur trioxide reacts rapidly with hydrogen chloride and hydrogen fluoride.

Phosphorus pentoxide (phosphoric anhydride, $P_2O_5$) also removes hydrogen chloride completely with formation of phosphorus oxychloride and metaphosphoric acid according to the equation

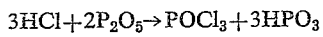
$$3HCl + 2P_2O_5 \rightarrow POCl_3 + 3HPO_3$$

There is no detectable reaction between phosphorus pentoxide and carbonyl fluoride. Any hydrogen fluoride present in the reaction product is also absorbed with formation of phosphorus oxyfluoride. While the latter is a gas, it can be readily separated from carbonyl fluoride by fractional distillation since it boils at $-40°$ C.

The hydrogen chloride absorbents discussed above all convert hydrogen chloride to stable products having boiling points widely different from that of carbonyl fluoride. With the alkali metal fluorides, solid alkali metal halides are obtained; with sulfur trioxide, the product is chlorosulfonic acid, B. P. 150° C.; and with phosphorus pentoxide, it is phosphorus oxychloride, B. P. 107° C. All these products are therefore readily separable from carbonyl fluoride.

In all cases, the reaction whereby hydrogen chloride is absorbed appears to proceed very slowly at temperatures below 0° C. It is therefore recommended to bring the reaction product and the absorbent material in contact at temperatures above about 0° C. When the mixture reaches or slightly exceeds that temperature, a mildly exothermic reaction takes place between the absorbent and the hydrogen chloride, which generally raises the temperature to 40–60° C. Experiments have shown that, at an initial temperature in the range 0–20° C. the reaction between the hydrogen chloride and the absorbent is substantially complete in a short time, between 5 and 25 minutes, depending on the absorbent. Contact between the reaction product and the absorbent can, of course, be maintained for much longer periods of time. When sulfur trioxide is used, however, some of the phosgene present, if any, may be converted to sulfuryl chloride and carbon dioxide on prolonged contact. There is no harm in using temperatures substantially in excess of that attained in the spontaneous exothermic reaction. For example, contact temperatures of 150° C. or higher can be used, although there is no advantage in doing so.

A convenient procedure for removing the hydrogen chloride and excess or unreacted hydrogen fluoride from the crude product consists in transferring the gaseous reaction mixture to a cylinder containing from 2 to 2.5 moles of sodium fluoride per mole of hydrogen chloride, and one mole of sodium fluoride per mole of hydrogen fluoride in the gases treated. This is done by evacuating the cylinder containing the sodium fluoride, cooling it in liquid nitrogen and admitting into it the crude gaseous reacton mixture or the same after trapping out, by means of low temperature ($-15°$ C.) trap, most of the hydrogen fluoride in the reaction gases, the reaction gases being preferably but not necessarily cooled down to or in the neighborhood of room temperature. If carbon monoxide is present in the reaction mixture, which is normally the case when the initial carbonyl-containing reactant is a mixture of carbon monoxide and chlorine, rather than preformed phosgene, it can be separated by pumping it off under reduced pressure from the cylinder (cooled in liquid nitrogen) containing the sodium fluoride and the reaction mixture. The cylinder is then closed, allowed to warm up to room temperature and maintained at that temperature until absorption of the hydrogen chloride is substantially complete. It is difficult to state precisely the minimum length of time needed for this removal since it depends on variables such as the relative proportions of reactants and the pressure developed in the absorption vessel. In general, a contact time of at least 10 minutes, preferably at least one-half hour after the reactants have reached room temperature is desirable. However, a very accurate test of the substantial completion of the hydrogen chloride removal is available through infrared spectroscopic analysis of the reaction mixture.

Sometimes the above described treatment does not remove the last traces of hydrogen chloride from the reaction mixture. In such cases a second, similar treatment with another portion of sodium fluoride, e. g., one-quarter to one-half the amount used in the first treatment, completes the purification.

A similar procedure is used when sulfur trioxide or phosphorus pentoxide is used as the hydrogen chloride absorbent. With these absorbents the period of contact can be even shorter, e. g., from five minutes to one-half hour. One mole of sulfur trioxide is required per mole of hydrogen halide (HCl or HF) present in the reaction product, and with phosphorus pentoxide two-thirds of a mole is required per mole of hydrogen halide.

Other procedures can be used for removing hydrogen chloride from the reaction product. For example, the crude gaseous mixture can be passed continuously through tubes or towers containing the absorbent material, with recycling if necessary. Also, the crude reaction product can be subjected to a preliminary fractionation to remove the easily separable components, and the non-separable mixture of carbonyl fluoride and hydrogen chloride can then be purified by treatment with the absorbent material.

The gaseous reaction product remaining after this purification is transferred to a cooled, evacuated storage cylinder where it can be kept for future use. If desired, this product can be further enriched in carbonyl fluoride by fractionation in a low temperature, high pressure still.

The process is illustrated by the examples given below either in descriptive or in tabular form. In the examples carried out in closed systems, the reactants were heated at the specified temperature and for the specified time in a bomb of 140 ml. capacity lined with a corrosion-resistant nickel-iron-molybdenum alloy. At the completion of the heating period, the reactants were usually allowed to cool in the reaction bomb overnight and then bled into an evacuated, cooled cylinder containing the hydrogen chloride absorbent. In some cases (e. g., Examples 2, 3, 4, 6, 7, 10) the crude reaction mixture was bled hot from the bomb. If any carbon monoxide was present, either as unreacted starting material or as pressuring gas, it was removed by pumping the cylinder cooled in liquid nitrogen down to about 0.1 mm. pressure. The remaining product was left in contact with the absorbent material in the cylinder at room temperature for periods of time ranging from about 2 to about 16 hours. When the absorbent material was anhydrous sodium fluoride (Examples 1–14, 16–19), there was used from 2 to 3 moles of it per mole of hydrogen chloride theoretically formed. The last traces of hydrogen chloride were in most cases removed by transferring the remaining gas to a second evacuated and cooled cylinder containing somewhat more than two moles of anhydrous sodium fluoride per mole of hydrogen chloride in the gases treated. When the absorbent material was sulfur trioxide (Example 15), there was used 1.25 moles of it per mole of hydrogen chloride theoretically formed, and the second treatment was omitted. When the absorbent material was phosphorus pentoxide (Example 26) there was used 0.83 mole of it per mole of hydrogen chloride theoretically formed and the second treatment was also omitted.

In the examples carried out in a continuous flow system at atmospheric pressure using hydrogen fluoride and phosgene as the reactants (Examples 20–26), the reactor was a nickel tube, one inch inside diameter and 29 inches long, of which a 13-inch length was heated in an electric furnace. The tube either did not contain any contact material (Example 23) or was packed within its heated portion with active carbon (Examples 20–22) or with calcium fluoride pellets (Examples 24, 25). Prior to reaction, the contact materials were heated for several hours in a slow stream of helium to remove water and trapped gases. The same contact material was used for a number of successive runs. The reactants were weighed separately, then mixed in a cylinder and the reactant mixture was bled through the reactor at a predetermined bubble rate, together with a slow stream of helium to prevent possible backsurges of air into the apparatus. The reactor temperature was determined with a thermocouple. After passage through the reactor, the effluent gas was led through two copper traps cooled in carbon dioxide/acetone, then through two glass traps cooled in liquid nitrogen. The products collected in the liquid nitrogen traps and in the carbon dioxide/acetone traps were, in the case of Examples 20–25, collected separately in stainless steel cylinders containing 60 g. of sodium fluoride. After remaining in contact with the sodium fluoride for approximately 24 hours, the products were again collected separately. When phosphorus pentoxide was used as the absorbent material (Example 26) the collecting procedure was slightly different, as described in that example. The percent conversion of phosgene to carbonyl fluoride is based in all cases on the amount of phosgene with which the run was started, no correction being made for the phosgene which remained unreacted or which was converted to carbonyl chlorofluoride.

When the reactants in the continuous flow, atmospheric pressure reaction were hydrogen fluoride, carbon monoxide and chlorine (Examples 27–29) the same tubular reactor was used. In all cases, the reactor was packed, within its heated portion, with active carbon. The chlorine and the hydrogen fluoride were weighed in approximately 2:1 molar ratio into a stainless steel cylinder, which was warmed at 50–60° C. during the entire run. The carbon monoxide was metered into the reaction tube at a rate sufficient to have at least a 1:1 molar ratio of it with respect to chlorine. The three reactants entered the reaction tube at the same point. After passage through the reactor, the effluent gas was first led through copper traps cooled in an ice/ethanol bath whose temperature was between −13 and −17° C. The material collected in these traps appeared to be solely hydrogen fluoride since it was completely absorbed by sodium fluoride. The gas passed next through a glass trap cooled in a carbon dioxide/acetone mixture, then through two glass traps cooled in liquid nitrogen. The products condensed in the liquid nitrogen traps and in the carbon dioxide acetone traps were collected separately in stainless steel cylinders containing 80 g. of sodium fluoride. After remaining in contact with the sodium fluoride for 24 hours, the products, now free of hydrogen chloride and hydrogen fluoride, were again collected separately and their composition was determined by infrared analysis. The percent conversion to carbonyl fluoride in these examples is based on the hydrogen fluoride and chlorine initially weighed into the storage cylinder, no correction being made for the small but appreciable fraction of these reactants which did not actually pass through the reaction tube, or for the amount which was converted to carbonyl chlorofluoride or carbonyl chloride.

Following the removal of hydrogen chloride and hydrogen fluoride, the product gas was in all cases analyzed by infrared spectroscopy. The infrared reference standard was a sample of carbonyl fluoride prepared from carbon monoxide and silver II fluoride according to the procedure of Ruff et al., Z. anorg. allgem. Chem. 221, 154 (1934) which sample was shown to be 97% pure by mass spectrograph analysis. A redistilled sample of carbonyl chlorofluoride, prepared from phosgene and antimony trifluoride according to the procedure of Emeleus et al., J. Chem. Soc. 1948, 2183, served as the carbonyl chlorofluoride standard. In most cases, the reaction product contained very small amounts of silicon tetrafluoride, presumably resulting from hydrolysis of carbonyl fluoride by traces of water present in the infrared analysis cell and reaction of the resultant HF with the glass of the cell. Infrared analysis is sufficiently accurate for the purposes of this invention although chlorine, which was present in small amounts in many of the runs, as shown by bubbling the product through aqueous potassium iodide does not have an infrared absorption band and carbon dioxide is somewhat difficult to determine accurately in the presence of the carbonyl halides. However, neither of these difficulties vitiates the analyses to an appreciable degree. In some cases the products were also analyzed by mass spectrography and results were in very good agreement.

The product compositions given in the examples are based in most cases on infrared analysis of the first sample of gas bled from the storage cylinder. When the analysis was carried out on the last portions of gas mixtures rich in carbonyl fluoride, there was no difference in the percentages of this product present in both samples, from which it was concluded that no significant fractionation occurred in such products. Some fractionation probably occurred in samples poorer in carbonyl fluoride, e. g., containing 35–50% of this component.

EXAMPLE I

A bomb of 140 ml. capacity lined with a corrosion resistant nickel-iron-molybdenum alloy was charged with 20 g. (1.0 mole) of anhydrous commercial hydrogen fluoride and 49.5 g. (0.5 mole) of phosgene. The bomb was heated at a temperature of 150–152° C. for 3 hours under the autogenous pressure developed by the reactants and the reaction products at that temperature. At the completion of the heating period the reactants were allowed to cool in the bomb overnight and were then bled into an evacuated, cooled cylinder containing 80 g. (1.9 moles) of anhydrous sodium fluoride. The cylinder was cooled further by immersion in liquid nitrogen and evacuated down to 0.1 mm. pressure to remove any carbon monoxide present in the reaction product. The cylinder was allowed to warm up to room temperature and the reaction product was left in contact with the sodium fluoride for approximately 24 hours. The gaseous product was then transferred to a second evacuated cooled cylinder containing 40 g. (0.95 mole) of anhydrous sodium fluoride and again left in contact with the sodium fluoride at room temperature for about 16 hours. Finally, the residual gaseous product was transferred to an evacuated cylinder cooled in liquid nitrogen. There was thus obtained 33 g. of product which was shown by infrared analysis to contain no detectable amount of hydrogen chloride. It contained, on a molar basis, 40% carbonyl fluoride, 15% carbonyl chlorofluoride, 40% phosgene and 5% carbon dioxide. The conversion to carbonyl fluoride was 33%. Carbonyl fluoride of 95% purity can be obtained by distillation of this material through a low temperature, high pressure still.

The above example is Example 1 of Table I below, which gives the details of several examples carried out in closed systems under varying conditions of temperature, pressure and time, substantially as described in Example 1. In all cases the reactants were preformed phosgene and hydrogen fluoride, and anhydrous sodium fluoride was used to remove the hydrogen chloride.

oxide and chlorine. In all of these examples, the hydrogen chloride and unreacted hydrogen fluoride, if any, were removed from the reaction product with anhydrous sodium fluoride as already described. In some of these runs (Examples 10, 11) a phenomenon not observed when using preformed phosgene was noted. This was a temperature "flash," occurring in the runs carried out in the 300–400° C. range, which momentarily increased the temperature 50–100° C., as well as the pressure. This "flash" was not observed in runs carried out below 300° C.

*Table I*
PREPARATION OF CARBONYL FLUORIDES FROM PHOSGENE AND HYDROGEN CHLORIDE

| Example | Reactants (moles) | Temp., time | Pressure (atm.) | Weight NaF and time | Weight reaction product after removal of CO, HCl, HF (grams) | Composition of reaction product (moles percent) | Percent conversion to $COF_2$ |
|---|---|---|---|---|---|---|---|
| 1 | 1.0 HF / 0.5 $COCl_2$ | 150–152° C., 3 hours | Autog. | 1st pass 80 g. (24 hrs.) / 2nd pass 40 g. (3 days) | 33.5 | $COF_2$ (40) / COFCl (15) / $COCl_2$ (40) / $CO_2$ (5) | 33 |
| 2 | 1.0 HF / 0.5 $COCl_2$ / 9.7 g. activated charcoal | 150–172° C., 3 hours | 140 (autog.) | 1st pass 80 g. (1 day) / 2nd pass 40 g. (1 day) | 32.0 | $COF_2$ (70) / COFCl (20) / $COCl_2$ (5) / $CO_2$ (3) | 65 |
| 3 | 1.0 HF / 0.5 $COCl_2$ | 200° C., 0.25–0.50 hr. | Autog. | 1st pass 80 g. (3 days) / 2nd pass 40 g. (1 day) | 42.0 | $COF_2$ (30) / COFCl (10) / $COCl_2$ (50) / $CO_2$ (5) | 32 |
| 4 | 1.0 HF / 0.5 $COCl_2$ / 95. g. activated charcoal | 200–215° C., 0.25–0.50 hr. | 185 (autog.) | 1st pass 80 g. (3 days) / 2nd pass 40 g. (1 day) | 30.5 | $COF_2$ (75) / COFCl (15) / $COCl_2$ (5) / $CO_2$ (5) | 66 |
| 5 | 1.0 HF / 0.5 $COCl_2$ | 300° C., 3 hrs. | 310 (autog.) | 1st pass 80 g. (4 days) / 2nd pass 40 g. (1 day) | 30.2 | $COF_2$ (75) / COFCl (5) / $COCl_2$ (5) / $CO_2$ (5) | 67 |
| 6 | 1.0 HF / 0.5 $COCl_2$ / CO (800 atm. at 300° C.) | 300° C., 0.25–0.50 hr. | 800 | 1st pass 80 g. (1 day) / 2nd pass 40 g. (1 day) | 35.6 | $COF_2$ (65) / COFCl (20) / $COCl_2$ (15) / $CO_2$ (3) | 61 |
| 7 | 1.0 HF / 0.5 $COCl_2$ | 400° C., 0.25–0.30 hr. | 345 (autog.) | 1st pass 80 g. (1 day) / 2nd pass 40 g. (1 day) | 32.0 | $COF_2$ (75) / COFCl (20) / $COCl_2$ (4) / $CO_2$ (5) | 67 |

Table II below gives details on another series of examples in sealed systems in which phosgene was prepared in situ, by using as reactants carbon monoxide It will be seen from Table II that the conversions to carbonyl fluoride were in general higher than those obtained using preformed phosgene.

*Table II*
PREPARATION OF CARBONYL FLUORIDES FROM CARBON MONOXIDE, CHLORINE AND HYDROGEN FLUORIDE

| Example | Reactants (moles) | Temp., time | Pressure (atm.) | Weight NaF and time | Weight reaction product after removal of CO, HCl, HF (grams) | Composition of reaction product (moles percent) | Percent conversion to $COF_2$ |
|---|---|---|---|---|---|---|---|
| 8 | 1.0 HF / 0.5 $Cl_2$ / 1.0 CO | 400° C., 3 hrs. | 800 | 1st pass 84 g. (4 days) / 2nd pass 40 g. (3 days) | 30.4 | $COF_2$ (80) / COFCl (5) / $COCl_2$ (7) / $CO_2$ (3) | 71 |
| 9 | 1.2 HF / 0.39 $Cl_2$ / 0.94 CO | 400° C., 3 hrs. | 800 | 1st pass 105 g. (4 days) / 2nd pass 40 g. (1 day) | 24.4 | $COF_2$ (90) / COFCl (3) / $COCl_2$ (1) / $CO_2$ (5) | 86 |
| 10 | 1.0 HF / 0.5 $Cl_2$ / 0.78 CO | 335–340° C., .56–.75 hr. | 570–630 | 1st pass 105 g. (3 days) / 2nd pass 40 g. (1 day) | 28.8 | $COF_2$ (90) / COFCl (3) / $COCl_2$ (5) / $CO_2$ (3) | 76 |
| 11 | 1.0 HF / 0.5 $Cl_2$ / 1.31 CO | 300–303° C., 9.6 hrs. | 750–840 | 1st pass 84 g. (1 day) / 2nd pass 40 g. (1 day) | 32.5 | $COF_2$ (75) / COFCl (5) / $COCl_2$ (10) / $CO_2$ (5) | 73 |
| 12 | 1.0 HF / 0.5 $Cl_2$ / 1.5 CO | 200–210° C., 3 hrs. | 720–800 | 1st pass 80 g. (4 days) / 2nd pass 40 g. (1 day) | 31.1 | $COF_2$ (50) / COFCl (5) / $COCl_2$ (40) / $CO_2$ (5) | 39 |
| 13 | 1.0 HF / 0.5 $Cl_2$ / 0.5 CO / 9.5 g. activated charcoal | 206–210° C., 0.25–0.50 hr. | 260–300 | 1st pass 80 g. (4 days) / 2nd pass 40 g. (1 day) | 26.0 | $COF_2$ (75) / COFCl (10) / $COCl_2$ (10) / $CO_2$ (5) | 56 |
| 14 | 1.0 HF / 0.5 $Cl_2$ / 0.9 CO / 9.8 g. activated charcoal | 150–170° C., 1 hr. | 300–310 | 1st pass 80 g. (3 days) / 2nd pass 40 g. (1 day) | 28.5 | $COF_2$ (65) / COFCl (7) / $COCl_2$ (7) / $CO_2$ (5) | 53 |

EXAMPLE 15

This example describes the preparation of carbonyl fluoride by a procedure essentially similar to that of Examples 8–14, but using sulfur trioxide rather than sodium fluoride as the hydrogen chloride absorbent.

A bomb of 140 ml. capacity lined with a corrosion resistant nickel-iron-molybdenum alloy was charged with 20 g. (1.0 mole) of anhydrous commercial hydrogen fluoride and 35.5 g. (0.5 mole) of chlorine. Sufficient carbon monoxide was injected in the bomb to give a pressure of 800 atm. at 400° C. The bomb was heated at 392–400° C. for 1.25 hours and allowed to cool overnight. The gaseous reaction product was then bled into a 300 ml. cylinder cooled in liquid nitrogen and containing 100 g. (1.25 moles) of sulfur trioxide. The excess carbon monoxide was removed from the reaction product by evacuating the cylinder down to a pressure of 1.6 mm. of mercury. The cylinder was then warmed up to room temperature for 30 minutes, again cooled in liquid nitrogen and evacuated to 0.1 mm. of mercury. It was then again warmed to room temperature and held there for 2 hours with intermittent shaking. After this operation the cylinder was cooled to −12° C. and the residual gaseous product was distilled into another cylinder cooled in liquid nitrogen. The weight of the absorbent remaining in the first cylinder had increased to 130.6 g. There was obtained 29.2 g. of product which was shown by infrared analysis to be entirely free from hydrogen chloride and to contain, on a molar basis, 60% carbonyl fluoride, 30% carbonyl chlorofluoride, 5% carbon dioxide and 1% dichlorodifluoromethane. The conversion to carbonyl fluoride was 50%.

Table III below summarizes several examples in sealed systems in which one or both of the reactants, vis., hydrogen fluoride and phosgene, were prepared in situ directly in the reaction vessel from other reactants capable of forming them under the reaction conditions. These specific embodiments of the invention are entirely operable, but they are not preferred because of the mechanical difficulties already mentioned and because the conversions to carbonyl fluoride obtained thereby are in general lower than those obtained by employing phosgene, or a carbon monoxide/chlorine mixture, and hydrogen fluoride.

In the examples of Table III, as in the previous examples, the crude reaction product was treated with an absorbent material (anhydrous sodium fluoride) to remove the hydrogen chloride and hydrogen fluoride present. The sulfuric acid and hydrogen chloride used in three of these examples were, of course, anhydrous.

Table III
PREPARATION OF CARBONYL FLUORIDES FROM PHOSGENE AND HYDROGEN FLUORIDE MADE IN SITU

| Example | Reactants (moles) | Temp., time | Pressure (atm.) | Weight NaF and time | Weight reaction product after removal of CO, HCl, HF (grams) | Composition of reaction product (moles percent) | Percent conversion to COF$_2$ |
|---|---|---|---|---|---|---|---|
| 16 | 0.50 CaF$_2$<br>0.50 COCl$_2$<br>0.50 H$_2$SO$_4$ | 200° C., 3 hrs | Autog. | 1st pass 80 g. (1 day)<br>2nd pass 40 g. (1 day) | 30.5 | COF$_2$ (5)<br>COFCl (2)<br>COCl$_2$ (20)<br>CO$_2$ (20)<br>SO$_2$ (1) | About 5. |
| 17 | 0.26 CaF$_2$<br>0.25 Cl$_2$<br>0.49 HCl<br>CO (pressured to 600 atm.) | 500° C., 3 hrs | 600 | 1st pass 80 g. (1 day)<br>2nd pass 40 g. (3 days) | 14.5 | COF$_2$ (20)<br>COFCl (5)<br>COCl$_2$ (25)<br>CO$_2$ (15)<br>CCl$_2$F$_2$ (5)<br>CF$_3$Cl (5) | 15. |
| 18 | 0.3 CaF$_2$<br>0.3 Cl$_2$<br>0.32 H$_2$SO$_4$<br>CO (pressured to 800 atm.) | 300° C., 1 hr | 800 | 1st pass 80 g. (1 day)<br>2nd pass 40 g. (1 day) | 19.2 | COF$_2$ (20)<br>COFCl (20)<br>COCl$_2$ (30)<br>CO$_2$ (15)<br>SO$_2$ (5) | 17. |
| 19 | 0.35 CaF$_2$<br>0.70 Cl$_2$<br>0.35 CH$_2$O (as paraformaldehyde). | 499–504° C., 2 hrs | Autog. | 80 g., 1 pass (3 days) | 23.5 | COF$_2$ (20)<br>COFCl (10)<br>COCl$_2$ (25)<br>CO$_2$ (20)<br>CF$_3$Cl (5)<br>CCl$_2$F$_2$ (5) | 17. |

EXAMPLE 20

This and the following tabulated examples describe runs carried out at atmospheric pressure in a continuous flow system.

The reactor was a nickel tube, one inch inside diameter and 29 inches long, of which a 13-inch length was heated in an electric furnace. The tube was partly filled with activated carbon which occupied a volume of 117 ml. in the heated portion of the tube. Prior to reaction, this carbon packing was heated at 700–800° C. for 16 hours in a slow stream of helium to remove water and trapped gases.

Into a stainless steel cylinder containing 16.5 g. (0.825 mole) of anhydrous commercial hydrogen fluoride was distilled 36 g. (0.364 mole) of phosgene. The cylinder was connected to the reactor through a copper Y tube, the other branch of which was connected to a helium container. The cylinder containing the reactants was placed in a water bath at 40–50° C. and the reactants were bled out at a predetermined bubble rate, accompanied by a slow stream of helium to prevent backsurges. The other end of the reactor was connected to a train of receivers consisting of two copper traps cooled in carbon dioxide/acetone followed by two glass traps cooled in liquid nitrogen.

The reactor was heated to 195–200° C. and the reactants were passed through it over a period of 1.07 hours. The products condensed in the carbon dioxide/acetone and in the liquid nitrogen traps were collected separately in two stainless steel cylinders each containing 60 g. of anhydrous fluoride. After remaining in contact with the sodium fluoride for approximately 24 hours, the products were again collected separately. The material in the liquid nitrogen traps weighed 26.9 g. before contact with the sodium fluoride and 13.3 g. after; the material in the carbon dioxide/acetone traps weighed 20.7 g. before contact with the sodium fluoride and 9.5 g. after. Both residual materials were subjected to infrared analysis, which showed that they contained no detectable amount of hydrogen chloride. The product from the liquid nitrogen traps contained, on a molar basis, 90% carbonyl fluoride, 2% carbonyl chlorofluoride, 1% phosgene, 3% carbon dioxide and 1% silicon tetrafluoride. The product from the carbon dioxide/acetone traps contained, on a molar basis, 80% carbonyl fluoride, 4% carbonyl chlorofluoride, 4% phosgene, 4% carbon dioxide and 1% silicon tetrafluoride. The conversion to carbonyl fluoride was calculated to be 84%. Carbonyl fluoride of high purity can be obtained by distillation of these products through a low temperature, high pressure still.

The above example is Example 20 of Table IV below, which also summarizes several other examples in which the reaction was carried out in a continuous flow system at atmospheric pressure under similar conditions. In Examples 20, 21, and 22, the reactor was packed with active carbon; in Example 23 no contact material was used, and in Examples 24 and 25 the reactor was packed with calcium fluoride pellets. In these last two examples the material collected in the carbon dioxide/acetone traps was not analyzed. In all cases, the crude reaction product prior to infrared analysis was treated with sufficient sodium fluoride to remove the hydrogen chloride formed and any unreacted hydrogen fluoride. These runs were all carried out using phosgene and hydrogen fluoride as the reactants. The reaction times refer to the time it took for all the reactants to be passed from the storage cylinder to and through the reactor.

In Table IV, the columns headed I, II, III, and IV show, respectively: I, the weight of reaction product collected in the liquid nitrogen traps; II, the weight of the same product after treatment with sodium fluoride; III, the weight of reaction product collected in the carbon dioxide/acetone traps; IV, the weight of the same product after treatment with sodium fluoride. Products II and IV were subjected to infrared analysis and their composition is given in the table.

gene and 18 g. (0.90 mole) of anhydrous commercial hydrogen fluoride. This cylinder was warmed in a water bath at 43–45° C. during the entire run and the reactant mixture, together with a slow stream of helium as a carrier, was passed through the reactor tube heated at 200° C. over a period of 1.27 hours. There was left in the cylinder 3.5 g. of the reactant mixture at the end of the run.

At the exit end of the tube there was a train of receivers consisting of two copper traps cooled to −15 to −17° C. in an ice/ethanol mixture, then a glass trap cooled in a carbon dioxide/acetone mixture, and finally two glass traps cooled in liquid nitrogen. At the end of the run, the material condensed in the ice/ethanol traps amounted to 2.5 g. This was solely unreacted hydrogen fluoride, as shown by the fact that it was completely absorbed by anhydrous sodium fluoride. The material condensed in the carbon dioxide/acetone trap (20.5 g.) was transferred in the usual manner to a cylinder containing 80 g. of sodium fluoride. After remaining in contact with the sodium fluoride for four days at room temperature, the residual gaseous product (16.0 g.) was found by infrared analysis to be free from hydrogen chloride and to contain, on a molar basis, 5% carbonyl fluoride, 15% carbonyl chlorofluoride, 2% carbon dioxide, and 75% phosgene.

The material condensed in the liquid nitrogen traps (29.0 g.) was transferred to a stainless steel cylinder containing 97 g. (0.68 mole) of phosphorus pentoxide. Approximately 15–20 minutes after the outside surface of this cylinder appeared to be at room temperature, an exothermic reaction took place whereby the cylinder warmed up to about 40–45° C., then cooled off again. Contact

*Table IV*

PREPARATION OF CARBONYL FLUORIDES FROM PHOSGENE AND HYDROGEN FLUORIDE AT ATMOSPHERIC PRESSURE

| Example | Reactants (moles) | Temp., time | Wt. NaF and time | Weight reaction product (g.) | | | | Composition of reaction product (moles percent) | | Percent conversion to $COF_2$ |
|---|---|---|---|---|---|---|---|---|---|---|
| | | | | Liquid $N_2$ traps | | $CO_2$/acetone traps | | II | IV | |
| | | | | I | II | III | IV | | | |
| 20 | 0.825 HF<br>0.364 $COCl_2$ | 195–200° C., 1.07 hrs | 60 g. (24 hrs.) | 26.9 | 13.3 | 20.7 | 9.5 | $COF_2$ (90)<br>COFCl (2)<br>$COCl_2$ (1)<br>$CO_2$ (3)<br>$SiF_4$ (1) | $COF_2$ (80)<br>COFCl (4)<br>$COCl_2$ (4)<br>$CO_2$ (4)<br>$SiF_4$ (1) | 84 |
| 21 | 1.00 HF<br>0.46 $COCl_2$ | 286–290° C., 1.50 hrs | 60 g. (24 hrs.) | 35.2 | 16.5 | 26.7 | 14.0 | $COF_2$ (85)<br>COFCl (5)<br>$COCl_2$ (1)<br>$CO_2$ (3)<br>$SiF_4$ (3) | $COF_2$ (15)<br>COFCl (5)<br>$COCl_2$ (80)<br>$CO_2$ (1)<br>$SiF_4$ (1) | 51 |
| 22 | 0.925 HF<br>0.425 $COCl_2$ | 384–402° C., 1.33 hrs | 60 g. (24 hrs.) | 30.2 | 13.5 | 25.8 | 12.0 | $COF_2$ (90)<br>COFCl (4)<br>$COCl_2$ (>1)<br>$CO_2$ (2)<br>$SiF_4$ (1) | $COF_2$ (60)<br>$COCl_2$ (18)<br>COFCl (15)<br>$CO_2$ (2)<br>$SiF_4$ (1) | 67 |
| 23 | 0.775 HF<br>0.358 $COCl_2$ | 495–506° C., (1.23 hrs.) | 60 g. (3 days) | 10.3 | 3.7 | 37.0 | 22.2 | $COF_2$ (90)<br>$CO_2$ (5)<br>$SiF_4$ (1) | $COF_2$ (15)<br>COFCl (10)<br>$COCl_2$ (60)<br>$SiF_4$ (1) | 25 |
| 24 | 0.900 HF<br>0.414 $COCl_2$ | 495–497° C., (1 hr.) | 60 g. (24 hrs.) | 24.6 | 11.4 | | | $COF_2$ (80)<br>COFCl (trace)<br>$COCl_2$ (trace)<br>$CO_2$ (3)<br>$SiF_4$ (1) | | 33 |
| 25 | 0.750 HF<br>0.344 $COCl_2$ | 704–711° C., (1 hr.) | 60 g. (24 hrs.) | 19.0 | 12.0 | | | $COF_2$ (80)<br>COFCl (1)<br>$COCl_2$ (trace)<br>$CO_2$ (2)<br>$SiF_4$ (0.5) | | 42 |

EXAMPLE 26

This example illustrates the use of phosphorus pentoxide as the hydrogen chloride absorbent.

A hollow graphite tube of 0.75 inch inside diameter was packed with high purity acetylene black for about 9 inches of its length and placed inside the nickel tube used in Examples 20–25. Prior to reaction, the tube containing the acetylene black was heated at 800° C. in a slow stream of helium for about 16 hours.

Following the procedure of Example 20, a stainless steel cylinder was charged with 40.5 g. (0.41 mole) of phosbetween the reaction product and the phosphorus pentoxide was continued for 16 hours at room temperature. The residual gaseous product (13.0 g.) was then found by infrared analysis to be entirely free from hydrogen chloride and to contain, on a molar basis, 80% carbonyl fluoride, 15% carbonyl chlorofluoride, 5% carbon dioxide, less than 1% phosgene, about 1% silicon tetrafluoride, and a trace of phosphorus oxyfluoride. The weight increase of the phosphorus pentoxide was 16 g. The conversion of phosgene to carbonyl fluoride was 37%.

Table V below summarizes three other examples carried out in a continuous flow system at atmospheric pressure essentially by the procedure of Example 26, but using as reactants hydrogen fluoride, carbon monoxide and chlorine rather than hydrogen fluoride and preformed phosgene and using sodium fluoride as the hydrogen chloride absorbent. The heated zone of the reaction tube was packed with active carbon. The columns headed I, II, III, IV and V show, respectively: I, the weight of reaction products collected in the liquid nitrogen traps; II, the weight of the same product after treatment with sodium fluoride; III, the weight of reaction product collected in the carbon dioxide/acetone traps; IV, the weight of the same product after treatment with sodium fluoride; and, V, the weight of reaction product collected in the ice/ethanol trap. This last product was unreacted hydrogen fluoride. Products II and IV were subjected to infrared anaylsis and their composition is given in the table. Unreacted chlorine was detected qualitatively in the reaction product through its reaction with aqueous potassium iodide. It is not detected by infrared analysis.

EXAMPLE 32

A mixture of 0.5 mole of hydrogen fluoride, 0.5 mole of phosgene and 0.01 mole (0.84 g.) of aluminum trifluoride was heated in a bomb at 500° C. for two hours under autogenous pressure. The gaseous reaction product weighed 46.0 g., from which the hydrogen chloride can be removed by sodium fluoride treatment, leaving the carbonyl fluoride in the reaction product. It can also be scrubbed with 40% aqueous potassium hydroxide to remove all the acidic and hydrolyzable components, leaving only the alkali-unreactive products. The residual inert gas (12.6 g.) contained, on a molar basis and after alkali scrubbing 5% carbon tetrachloride, 75% chlorotrifluoromethane, 20% dichlorodifluoromethane and 1% trichlorofluoromethane.

When this experiment was repeated except that the aluminum fluoride catalyst was omitted, there was obtained 40.5 g. of crude gaseous product which, after scrubbing with aqueous potassium hydroxide, left 6.8 g. of inert gas. This contained, on a molar basis, 10% chlorotri-

*Table V*

PREPARATION OF CARBONYL FLUORIDE FROM HF, CO AND $Cl_2$ AT ATMOSPHERIC PRESSURE

| Example | Reactants (moles) | Temp., time | Weight reaction product (g.) | | | | | Composition of reaction product (moles percent) | | Percent conversion to $COF_2$ |
|---|---|---|---|---|---|---|---|---|---|---|
| | | | Liq. $N_2$ traps | | $CO_2$/acetone traps | | Ice/alc. traps | | | |
| | | | I | II | III | IV | V | II | IV | |
| 27 | 1.25 HF<br>0.62 $Cl_2$<br>0.89 CO | 142–154° C., 2.0 hrs | 41 | 19 | 31 | 23 | 5.5 | $COF_2$ (70)<br>COFCl (5)<br>$COCl_2$ (2)<br>$CO_2$ (5)<br>$SiF_4$ (trace)<br>$Cl_2$ | $COF_2$ (1)<br>COFCl (5)<br>$COCl_2$ (15)<br>$CO_2$ (1)<br>$Cl_2$ | 32 |
| 28 | 0.95 HF<br>0.48 $Cl_2$<br>0.48 CO | 199–214° C., 1.10 hrs | 36 | 17.5 | 14 | 11 | 4 | $COF_2$ (75)<br>COFCl (2)<br>$COCl_2$ (2)<br>$CO_2$ (5)<br>$SiF_4$ (1)<br>$Cl_2$ | $COF_2$ (1)<br>COFCl (5)<br>$COCl_2$ (15)<br>$CO_2$ (5)<br>$Cl_2$ | 41 |
| 29 | 0.95 HF<br>0.45 $Cl_2$<br>0.79 CO | 288–300° C., 1.87 hrs | 35 | 14 | 14 | 9 | 6 | $COF_2$ (65)<br>COFCl (5)<br>$COCl_2$ (2)<br>$CO_2$ (5)<br>$SiF_4$ (3)<br>$Cl_2$ | $COF_2$ (10)<br>COFCl (15)<br>$COCl_2$ (60)<br>$CO_2$ (5)<br>$SiF_4$ (1) | 32 |

When the reaction is conducted in the higher temperature range, in the neighborhood of 500° C. the formation of carbonyl fluoride is accompanied by the formation of chlorofluoromethanes. The particular object of Examples 30, 31, and 32 below was the determination of the formation of chlorofluoromethanes.

EXAMPLE 30

A mixture of 1.5 moles of hydrogen fluoride and 0.37 mole of phosgene was heated in a corrosion-resistant bomb at 500° C. for three hours under autogenous pressure. The gaseous reaction product (65.5 g.) contained, on a molar basis, 20% $COF_2$, 10% COFCl, 10% $CO_2$, 5% chlorotrifluoromethane and some $SiF_4$ (from unreacted HF by action on the glass of the infrared analyzer). The remainder was chlorine and hydrogen chloride. The hydrogen chloride can be removed by the sodium fluoride treatment as above.

EXAMPLE 31

A mixture of 1.0 mole of hydrogen fluoride, 0.5 mole of phosgene and 0.008 mole (2.3 g.) of antimony pentachloride was treated as above. The gaseous reaction product (47 g.) contained, on a molar basis, 30% $COF_2$, 15% COFCl, 10% $CO_2$, 10% chlorotrifluoromethane, 1% dichlorodifluoromethane, 2% carbon tetrafluoride and some $SiF_4$.

fluoromethane, 75% dichlorodifluoromethane, 15% trichlorofluoromethane and traces of carbon tetrafluoride and carbon tetrachloride.

The product obtained by reacting phosgene with hydrogen fluoride and removing the hydrogen chloride and hydrogen fluoride according to the foregoing description can be further enriched in carbonyl fluoride by fractionation at low temperature and elevated pressure, for example through a Monel metal column, 45 inches high and 1.75 inches internal diameter, packed with small stainless steel rings. The still is designed, like all low temperature pressure stills, to distil at constant temperatures and cuts are made as the pressure changes. The still head was surrounded by coils through which acetone cooled in a carbon dioxide/acetone bath was circulated. There is thus obtained a product consisting essentially of carbonyl fluoride, with small amounts of carbon dioxide. For illustrative purposes, details of a typical fractionation are given below.

The products of six syntheses carried out under a variety of conditions from carbon monoxide, chlorine and hydrogen fluoride were composited after removal of excess carbon monoxide and of hydrogen chloride and hydrogen fluoride as described above. The six individual products had the following compositions, as determined by infrared analysis:

| Product | Weight (g.) | Composition (moles percent) |
|---|---|---|
| 1 | 28 | $COF_2$ (70); $COFCl$ (5); $COCl_2$(10); $CO_2$(3). |
| 2 (Ex. 8) | 27 | $COF_2$(80); $COFCl$ (5); $COCl_2$(7); $CO_2$(3). |
| 3 (Ex. 9) | 21 | $COF_2$(90); $COFCl$ (3); $COCl_2$(1); $CO_2$(5). |
| 4 (Ex. 11) | 29 | $COF_2$(75); $COFCl$ (5); $COCl_2$(10); $CO_2$(5). |
| 5 (Ex. 12) | 30.5 | $COF_2$(50); $COFCl$ (5); $COCl_2$(40); $CO_2$(5). |
| 6 | 30.6 | $COF_2$(40); $COFCl$ (5); $COCl_2$(5); $CO_2$(5). (Remainder chiefly chlorine) |

Distillation of the composite gave the following fractions, boiling at the indicated temperatures and pressures and having the indicated compositions by infrared analysis:

| Fraction | B. P. (° C.) | Pressure (lb./sq. in.) | Weight (g.) | Composition (moles percent) |
|---|---|---|---|---|
| 1 | −68 to −70 | 32 to 33.7 | 18.1 | $COF_2$ (70). $CO_2$ (15). $SiF_4$ (0.5). |
| 2 | −57 | 40 to 40.5 | 6.4 | Not analyzed. |
| 3 | −57 to −59 | 32.5 to 39 | 22.8 | $COF_2$ (90). $CO_2$ (5). $SiF_4$ (0.5). |
| 4 | −59 to −63 | 23 to 33.2 | 36.0 | $COF_2$ (95). $CO_2$ (1). $SiF_4$ (0.5). |
| 5 | −60 to −62 | 18 to 25.5 | 14.6 | $COF_2$ (90). $CO_2$ (2). $COFCl$ (0.5). $SiF_4$ (0.5). |
| 6 | Losses | | 10.0 | |
| 7 | Undistilled residue | | 61.2 | $COF_2$ (1). $COFCl$ (40). $COCl_2$ (25). $CO_2$ (0.5). Remainder chlorine. |

This invention provides an efficient and economical method of preparing, in good conversions and from readily available starting materials, carbonyl fluoride free from hydrogen chloride and suitable for such uses as the preparation of tetrafluoroethylene by reaction of carbonyl fluoride with carbon at temperatures of 1500° C. and above, e. g., in the carbon arc, the products of the reaction preferably being suddenly and completely quenched. A most useful embodiment of the process is that wherein phosgene and hydrogen fluoride are reacted at a temperature of 150–300° C. at atmospheric pressure in the presence of active carbon, and the hydrogen chloride formed is removed from the crude reaction product by treatment with anhydrous sodium fluoride.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of carbonyl fluoride, $COF_2$, wherein phosgene is reacted with at least one mole, per mole of phosgene, of hydrogen fluoride at a temperature of at least 50° C.; the reaction product, containing carbonyl fluoride and hydrogen chloride, is brought into contact at temperatures above about 0° C. with at least a stoichiometric amount, based on the hydrogen chloride and residual hydrogen fluoride therein, of an inorganic chemical compound of the group consisting of alkali metal fluorides, sulfur trioxide and phosphorus pentoxide, said compound being unreactive with carbonyl fluoride but reactive with hydrogen chloride to form stable products; and the reaction products are maintained in contact with said inorganic chemical compound until substantially all of the hydrogen chloride formed in the phosgene-hydrogen fluoride reaction is absorbed.

2. The process for the preparation of carbonyl fluoride, $COF_2$, wherein phosgene is reacted with at least one mole, per mole of phosgene, of hydrogen fluoride at a temperature of at least 50° C., the reaction product is brought into contact at temperatures above about 0° C. with at least a stoichiometer amount, based on the hydrogen chloride and hydrogen fluoride in the reaction product, of an alkali metal fluoride and the contact is maintained until substantially all of the hydrogen chloride is absorbed from the reaction product.

3. The process for the preparation of carbonyl fluoride, $COF_2$, wherein phosgene is reacted with at least one mole, per mole of phosgene, of hydrogen fluoride at a temperature of at least 50° C., the reaction product is brought into contact at temperatures above about 0° C. with at least a stoichiometric amount, based on the hydrogen chloride and hydrogen fluoride in the reaction product, of sodium fluoride and the contact is maintained until substantially all of the hydrogen chloride is absorbed from the reaction product.

4. The process for the preparation of carbonyl fluoride, $COF_2$, wherein phosgene is reacted with at least one mole, per mole of phosgene, of hydrogen fluoride at a temperature of at least 50° C., the reaction product is brought into contact at temperatures above about 0° C. with at least a stoichiometric amount, based on the hydrogen chloride and hydrogen fluoride in the reaction product, of sulfur trioxide and the contact is maintained until substantially all of the hydrogen chloride is absorbed from the reaction product.

5. The process for the preparation of carbonyl fluoride, $COF_2$, wherein phosgene is reacted with at least one mole, per mole of phosgene, of hydrogen fluoride at a temperature of at least 50° C., the reaction product is brought into contact at temperatures above about 0° C. with at least a stoichiometric amount, based on the hydrogen chloride and hydrogen fluoride in the reaction product, of phosphorus pentoxide and the contact is maintained until substantially all of the hydrogen chloride is absorbed from the reaction product.

6. The process for the preparation of carbonyl fluoride, $COF_2$, wherein phosgene is reacted with at least one mole, per mole of phosgene, of hydrogen fluoride, at a temperature of 150–300° C. at atmospheric pressure in the presence of active carbon; the reaction product is brought into contact at temperatures above about 0° C. with at least a stoichiometric amount, based on the hydrogen chloride and hydrogen fluoride in the reaction product, of sodium fluoride; and the reaction products are maintained in contact with the sodium fluoride until substantially all of the hydrogen chloride formed in the phosgene-hydrogen fluoride reaction is absorbed.

7. The process of claim 1 wherein the carbonyl chlorofluoride formed in the reaction is isolated and heated at 400–600° C. and the resultant carbonyl fluoride isolated.

8. The process wherein carbonyl chlorofluoride is disproportionated by heating at 400–600° C. and the resultant carbonyl fluoride isolated.

9. The process which comprises contacting, at a temperature of above about 0° C., a mixture of carbonyl fluoride and hydrogen chloride with an inorganic chemical compound of the group consisting of alkali metal fluorides, sulfur trioxide and phosphorous pentoxide, said compound being unreactive with carbonyl fluoride but reactive with hydrogen chloride to form stable products, the molar ratio of the inorganic compound to hydrogen chloride being at least stoichiometric, to react hydrogen chloride with the inorganic compound and thereby remove the hydrogen chloride from the carbonyl fluoride.

10. In a process yielding carbonyl fluoride which yields hydrogen chloride in mixture therewith, the step of contacting, at a temperature of above about 0° C., said mixture with an inorganic chemical compound of the group consisting of alkali metal fluorides, sulfur trioxide and phosphorus pentoxide, said compound being unreactive with carbonyl fluoride but reactive with hydrogen chloride to form stable products, the molar ratio of the inorganic compound to hydrogen chloride being at least stoichiometric, to react hydrogen chloride with the inorganic compound and thereby remove the hydrogen chloride from the carbonyl fluoride.

References Cited in the file of this patent

UNITED STATES PATENTS 2,526,776　　Smith et al. _____ Oct. 24, 1950

OTHER REFERENCES

Kwasnik, Fiat Review of German Science, 1939–1946, Inorganic Chemistry I, p. 242 (1948).

Simons et al., J. A. C. S., vol. 68 p. 1672–3 (1946).